Figure 1:
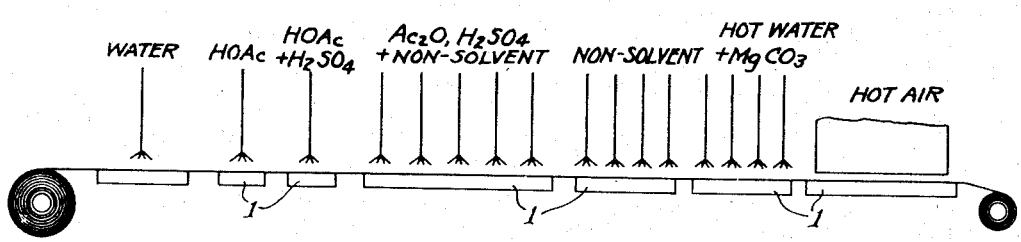

Oct. 11, 1949.   L. E. HERDLE ET AL   2,484,455
METHOD OF CONTINUOUSLY ESTERIFYING CELLULOSE
Filed March 26, 1946

LLOYD E. HERDLE
ERVIN L. PERKINS
INVENTORS

BY
ATTORNEYS

Patented Oct. 11, 1949

2,484,455

UNITED STATES PATENT OFFICE 2,484,455

METHOD OF CONTINUOUSLY ESTERIFYING CELLULOSE

Lloyd E. Herdle and Ervin L. Perkins, Rochester, N. Y., assignors to Eastman Kodak Company, Rochester, N. Y., a corporation of New Jersey Application March 26, 1946, Serial No. 657,222

7 Claims. (Cl. 260—227)

This invention relates to a method of continuously preparing lower fatty acid esters of cellulose, particularly cellulose acetate.

The processes which are commonly employed at the present time for the preparation of lower fatty acid esters of cellulose are of the batch type and employ procedures which necessitate a period of several hours. In those processes the reaction is usually started at a low temperature and as the reaction proceeds, the temperature increases. In the "dope" type of esterification the cellulose ester formed goes into solution in the reaction mass, whereas in the "fibrous" type of esterification the cellulose, even though esterified, remains in fibrous form. In these batch operations a mild esterification reaction has been necessary to insure high viscosity products of good quality.

Processes have been proposed for the continuous acetylation of cellulose but those processes have been mainly based upon mechanical handling methods for carrying through the various steps of the process. These processes have been along the lines of slow esterification, no effort having usually been made to speed up the reaction.

We have found that in accordance with our invention cellulose acetate may be manufactured by continuous acetylation in a method in which the cellulose is well activated and then thoroughly saturated with a small proportion of catalyst, followed by pulling anhydride through the cellulose. We have found that our continuous acetylation process is very conveniently carried out by using the cellulose in sheet form in which form it remains at least until the acetylation portion of the process is reached. By means of a thorough activation of the cellulose prior to the esterification proper and the incorporation in the cellulose of the catalyst by distributing it uniformly therethrough, the entire esterification period of the cellulose is shortened. By the use of a thorough activation of the cellulose and a uniform incorporation of catalyst therein, the cellulose upon contacting with acetic anhydride reacts rapidly, whether the esterification is of the fibrous or the dope type. Due to the rapidity of the reaction, the cellulose is protected from severe degradation and loss of viscosity while in the acetylation state of the process.

One object of our invention is to provide a continuous method for acetylating cellulose. Another object of our invention is to provide a method for preparing cellulose esters in which the esterification is rapidly carried out. A further object of our invention is to provide a method of esterifying cellulose characterized by uniform esterification of the cellulose mass. A still further object of our invention is to provide a continuous method of esterifying cellulose which utilizes cellulose, particularly woodpulp in sheet form as it is available commercially. A still further object of our invention is to provide a continuous method of esterifying cellulose which can be adapted to the formation of a product, whether in fibrous or dope form. Other objects of our invention will appear herein.

We have found that a rapid continuous process of preparing cellulose esters results when cellulose in sheet form is led through the following series of steps: (1) the cellulose sheet is thoroughly saturated with water, (2) the cellulose sheet is dewatered by replacing the water with glacial acetic acid, (3) the cellulose sheet is subjected to a "pull through" of a solution of an acetylation catalyst, such as sulfuric acid in acetic acid to uniformly distribute catalyst through the cellulose sheet, and (4) the sheet is subjected to the action of acetic anhydride using a temperature and a catalyst concentration sufficient to cause rapid esterification. By continuously passing the cellulose sheet through a series of operations in which these steps are present, cellulose acetate is formed continuously, the cellulose sheet being moved through the series of operations in accordance with the esterification rate which is present.

Figure 2:
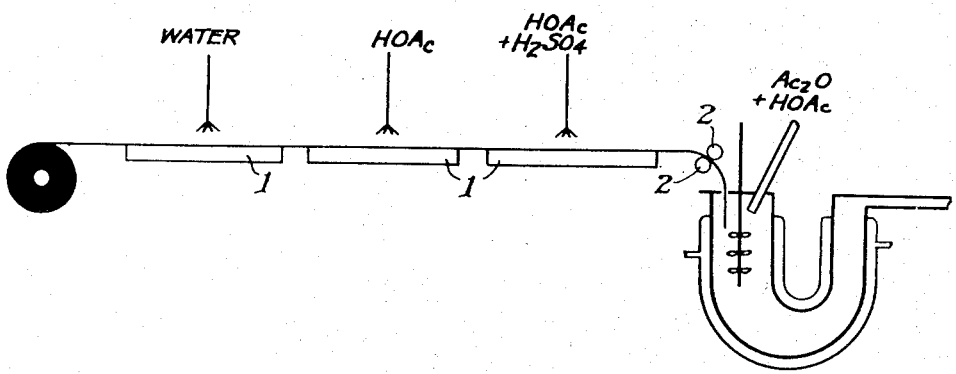

The accompanying drawing illustrates methods by which cellulose is continuously esterified in accordance with our invention. Figure 1 illustrates a continuous fibrous esterification method, whereas Figure 2 illustrates a continuous esterification method in which the cellulose ester is obtained in dope form. In Figure 1 the cellulose sheet, A, is led over a series of suction boxes, 1, in which the cellulose is subjected to a series of treatments in accordance with the invention. The cellulose sheet is first saturated with water, this portion of the process using but a few seconds. The water which is sucked through the sheet may be at a temperature from 0° C. to boiling, and the time may vary from 10 to 20 seconds although the time may be extended, if desired. With many types of cellulose the temperature used is not critical, and a temperature of 30° C. is quite suitable. For other less active types of cellulose higher temperatures, such as 70–100° C. would be more desirable for this water treatment. Also, the time may be longer than 20 seconds. However, in a process of this nature, shortness of time is desirable. The pH of the water may be that usually found in natural water (5.5 to 7.5). If desired, after this water operation the cellulose may be passed through squeeze rolls, this, however, being optional. For instance, if desired, squeeze rolls may be used to reduce the water content down to 50%. The cellulose sheet is then passed under a spray of acid, either acetic, other fatty acids, or mixtures thereof and over a suction box, so as to displace the water from the cellulose with fatty acid. The acid temperature is not critical, any temperature which keeps the acid in liquid form being suitable, although with some types of pulp high temperature acid extraction (such as 70–100° C.) is desirable for removal of color-imparting impurities. The sheet is then led under a spray of fatty acid and catalyst, such as glacial acetic acid having a sulfuric acid concentration therein of 0.5–3% thereby uniformly introducing catalyst into the cellulose sheet. The sulfuric acid strength to be used is optional with the individual operator, this usually being adjusted in accordance with the difficulty of penetrating and esterifying the cellulose and the viscosity level which is sought. The time and temperature conditions for this operation may be those which have been pointed out above as suitable in the "pull through" operations using water and glacial acetic acid. It is preferable after this point to pass the sheet through pressing rolls so that the liquid content is reduced to 50%. The sheet is then led over a suction box and is sprayed with a mixture of acetic or other fatty acid anhydride, non-solvent and catlyst, the sheet being slowly moved along so that 5–15 minutes are allowed for the esterification. The anhydride which is applied to the sheet is diluted with at least equal parts of a non-solvent, such as benzene or carbon tetrachloride and contains 0.5–3% of acylation catalyst. After the sheting has been contacted with the mixture containing anhydride for 5 to 15 minutes, the sheet is then preferably led over a suction box where it is sprayed with a non-solvent to remove the anhydride from the sheet, this being for the purpose of recovering unused anhydride which would otherwise be converted to fatty acid in the subsequent washings with water. The sheet is then led over a suction box and sprayed with water, preferably hot, to remove catlyst. The last washings can be carried out beneficially in the presence of a suitable buffering agent, such as magnesium carbonate, or some other agent tending to alkalinity. The alkaline material is used in solution (such as about 1%) in the washing water. The sheet may then be led over a suction box and treated with warm air to remove the non-solvent and water therefrom. There is thus obtained a sheet of cellulose acetate in substantially fully esterified condition. It is preferred in the esterification portion of the process that the temperature of the mixture of acetic anhydride and non-solvent be 35–50° C., the temperature used depending on the catalyst proportion employed, in order to assure complete esterification within a time which would be satisfactory for an esterification operation.

Figure 2 illustrates a continuous method of preparing cellulose acetate by a dope esterification process. The cellulose sheet is led over suction boxes and is treated with water, glacial acetic acid, and a mixture of glacial acetic acid and sulfuric acid, respectively, so as to activate the cellulose and uniformly distribute catalyst therein. As in the previous case, other fatty acids, such as propionic and butyric can be used. The cellulose sheet is then led by means of draw rolls, 2, into a jacketed mixer supplied with fatty acid anhydride and fatty acid, whereupon the cellulose is esterified and withdrawn as a solution of cellulose ester in fatty acid. Water is circulated through the jacket of the esterification chamber so as to maintain a maximum temperature of the reacting mass between 35 and 50° C. The activated catalyst-containing cellulose sheet as it is introduced into the chamber and contacted with the anhydride is disintegrated almost immediately. As it works its way through the chamber, the esterification is completed. The length of chamber should be such that complete esterification is achieved. If desired instead, a jacketed conditioning chamber (not shown) may be employed to make possible longer time of treatment and to adjust the outlet temperature of the mass. It is desirable in this chamber that the ratio of esterification liquid to cellulose be at least 8 to 1 and that the amount of anhydride introduced be at least 3 parts of anhydride for every part of pulp introduced therein. If squeeze rolls are employed between the treatment of the cellulose sheet with catalyst and the esterification chamber, it is ordinarily desirable that a large proportion of a mixture of anhydride and fatty acid be employed to assure the presence of sufficient liquid in the esterification chamber to result in a good plastic mass. The water in the water jacket of this esterification chamber should be so adjusted that the chamber itself is maintained at a maximum temperature, preferably within the range of 35 and 50° C. It is desirable that the esterification chamber be sufficiently long that complete conversion of the cellulose to cellulose acetate occurs or else an auxiliary chamber for conditioning next in line to the esterification chamber be employed. It is desirable that the cellulose which is introduced into the esterification chamber contain 2–7% of catalyst, based on the bone-dry weight of the cellulose. After the cellulose acetate dope is formed, it may be passed to a hydrolysis procedure, such as by introducing sufficient water therein to kill the anhydride and allowing to stand at the desired temperature, following which the cellulose ester is precipitated. If a cellulose triester is desired, the cellulose ester may be directly precipitated from the dope, but it may be desirable instead to first subject the cellulose acetate while in dope form to a stabilizing treatment, such as by "killing" the anhydride with water and allowing the mass to stand for a short time (such as 1–3 hours) before precipitation. If a fibrous esterification process is carried out, the cellulose ester obtained in fibrous form may be employed as the triacetate directly.

Although our process is described primarily with reference to the manufacture of cellulose acetate in which acetic acid is employed in the pretreatment and acetic anhydride with, or without, a non-solvent is employed in the esterification; our esterification method is also useful for the preparation of propionic or butyric acid esters of cellulose. For example, in the pretreatment operations acetic acid may be employed, and for the esterification propionic or butyric anhydride may be used. If desired, propionic or butyric acid may be employed instead of acetic in the herein described operations. If desired, in making propionic or butyric acid esters of cellulose, the water in a wet cellulose sheet may be displaced with glacial acetic acid, and this in turn may be displaced with a mixture of propionic or butyric acid with esterification catalyst. The entire operation up to the time of mixing the cellulose with fatty acid anhydride need not take over two minutes, providing no holding period is desirable between the incorporation of the catalyst in the cellulose sheet and the treatment of the sheet with the anhydride. The following examples illustrate our invention:

*Example 1.*—A pulp sheet consisting of a high alpha-cellulose acetylation-grade woodpulp and having a weight of 100 pounds per 1000 square feet, a thickness of 0.48 inches, and a moisture content of 6% was subjected to a "pull through" of distilled water requiring a period of 8 to 10 seconds. The sheet was then subjected to a "pull through" with glacial acetic acid at a temperature of 30° C. and for a time of not more than 10 seconds. The acetic acid-containing sheet was then subjected to a "pull through" with glacial acetic acid containing sulfuric acid catalyst in 1.5% concentration. The catalyst-containing sheet was then subjected to a "pull through" with a mixture of acetic anhydride, benzene, and sulfuric acid catalyst. The catalyst was present in an amount equivalent to 1.5%, based on the mixture. Benzene was present in a ratio of 2 parts to 1 part of anhydride. The "pull through" operation was carried out at 45° C. for a 5-minute period. The acetylated fiber was then removed and washed. It was found to contain 43.3% acetyl and was almost completely soluble in tetrachlorethane, and had high solution viscosity.

*Example 2.*—A sheet of acetylation-grade woodpulp similar to that employed in the preceding example is continuously passed over a suction box and sprayed with distilled water having a temperature of 30° C., the sheet being moved along so that each point thereof contacted the suction box for about 10 seconds. The sheet moves along to a second suction box where a spray of glacial acetic acid of 30° C. plays on the sheet so that each point of sheet is in contact with the suction about 10 seconds. The sheet moves on to another suction box where it is sprayed with glacial acetic acid containing 1.5% of sulfuric acid using the same time as in the preceding steps. The sheet then passes through pressing rolls which reduce the liquid content to 50%. The sheet then passes to a jacketed chamber into which a mixture of acetic anhydride and acetic acid (1:2) is also introduced, the latter having a temperature of about 10° C. The liquid is introduced so that the ratio of liquid to cellulose is approximately 12:1. Cooling water is passed through the jacket surrounding the esterification chamber so that the reaction temperature reaches but does not substantially exceed 38° C. The completed esterification dope is continuously withdrawn from the chamber and mixed with aqueous acetic acid to destroy any anhydride present and to impart a water content of 5–10%. The mass is allowed to stand at 100° F. for 20–40 hours. The catalyst is neutralized with magnesium carbonate, and the cellulose acetate is separated from the mass by filtration.

The cellulose which may be employed in the continuous process in accordance with our invention is any acetylation-grade cellulose. In view of the fact that acetylation-grade woodpulp is ordinarily marketed in sheet form, it is very convenient to employ that material as the starting material for our process. However, included within the scope of our invention is the use of other cellulose materials in sheet form, such as cotton linters having different physical form. Whenever acetic acid, propionic acid, or butyric acid is referred to herein, it is to be understood as referring to the highly concentrated acids, unless otherwise designated. It is desirable to use acid having as low a water content as possible to avoid using up anhydride which would occur with the use of acid having an appreciable water content. Although the invention has been described using sulfuric acid as the acetylation catalyst, it is to be understood that other catalysts may be employed instead of sulfuric acid in our process, providing the conditions under which they are used are such that rapid esterification occurs. In the fibrous adaptation of our process one of the non-solvents ordinarily employed for this purpose may be employed in our esterification method. For instance, in addition to carbon tetrachloride and benzene other non-solvents, such as toluene, diamyl or dibutyl ether or the like may be employed.

The cellulose esters, particularly those prepared in dope form, may be subjected to hydrolysis by any of the methods of hydrolysis which are ordinarily used and which are described in the prior art. That art describing hydrolysis processes should be regarded as part of the disclosure of this specification. Wherever the term "pull through" is used herein, it is to be understood as referring to a method of treating cellulose sheet wherein there is a pressure differential between one surface and the other surface so that liquid is pulled through the cellulose sheet and thereby uniformly distributed throughout the entire sheet. It is by virtue of this pull through of catalyst into the cellulose sheet that our continuous esterification process is made possible, due to the rapid reaction which can be obtained upon a cellulose sheet which contains catalyst uniformly distributed therethrough.

We claim:

1. A process for preparing lower fatty acid esters of cellulose which comprises continuously leading fibrous cellulose sheet successively through a series of operations of (1) saturating the cellulose with water, (2) dewatering with substantially anhydrous fatty acid of 2–4 carbon atoms, (3) pullthrough of a 0.5–3% solution of acid esterification catalyst in fatty acid of 2–4 carbon atoms, and (4) esterification with at least three parts of anhydride of a fatty acid of 2–4 carbon atoms per part of cellulose, the ratio of esterification liquid to cellulose being at least 8:1.

2. A process for preparing lower fatty acid esters of cellulose which comprises continuously leading fibrous cellulose sheet successively through a series of operations of (1) saturating the cellulose with water, (2) dewatering with substantially anhydrous fatty acid of 2–4 carbon atoms, (3) pullthrough of a 0.5–3% solution of sulfuric acid in fatty acid of 2–4 carbon atoms, and (4) esterification with at least three parts of anhydride of a fatty acid of 2–4 carbon atoms per part of cellulose, the ratio of esterification liquid to cellulose being at least 8:1.

3. A process for preparing cellulose acetate which comprises continuously leading fibrous cellulose sheet successively through a series of operations of (1) saturating the cellulose with water, (2) dewatering with substantially anhydrous acetic acid, (3) pullthrough of a 0.5–3% solution of acid esterification catalyst in acetic acid and (4) esterification with at least three parts of acetic anhydride per part of cellulose, the ratio of esterification liquid to cellulose being at least 8:1.

4. A process for preparing lower fatty acid esters of cellulose which comprises continuously leading refined woodpulp sheet successively through a series of operations (1) saturating the woodpulp with water, (2) dewatering with substantially anhydrous fatty acid of 2-4 carbon atoms, (3) pullthrough of a 0.5-3% solution of sulfuric acid in fatty acid of 2-4 carbon atoms, and (4) esterification with at least three parts of anhydride of a fatty acid of 2-4 carbon atoms per part of bone-dry woodpulp, the ratio of esterification liquid to the bone-dry woodpulp being at least 8:1.

5. A process for preparing lower fatty acid esters of cellulose which comprises continuously leading refined woodpulp sheet successively through a series of operations of (1) saturating the woodpulp with water, (2) dewatering with substantially anhydrous acetic acid, (3) pullthrough of a 0.5-3% solution of sulfuric acid in acetic acid, and (4) esterification with at least three parts of acetic anhydride per part of bone-dry woodpulp, the ratio of esterification liquid to the bone-dry woodpulp being at least 8:1.

6. A process for preparing lower fatty acid esters of cellulose which comprises continuously leading fibrous cellulose sheet successively through a series of operations of (1) saturating the cellulose with water, (2) dewatering with substantially anhydrous fatty acid of 2-4 carbon atoms, (3) pullthrough of a 0.5-3% solution of sulfuric acid in fatty acid of 2-4 carbon atoms, and (4) esterification with a mixture of at least three parts of anhydride of a fatty acid of 2-4 carbon atoms per part of cellulose, non-solvent, and sulfuric acid, then subjecting the cellulose ester formed while still in sheet form to a pullthrough of non-solvent to remove the anhydride therefrom, followed by a pullthrough of hot water so as to thoroughly wash the cellulose ester.

7. A process for preparing lower fatty acid esters of cellulose which comprises continuously leading fibrous cellulose sheet successively through a series of operations of (1) saturating the cellulose with water, (2) dewatering with substantially anhydrous fatty acid of 2-4 carbon atoms, (3) pullthrough of a 0.5-3% solution of sulfuric acid in fatty acid of 2-4 carbon atoms, and (4) esterification with a mixture of at least three parts of anhydride of a fatty acid of 2-4 carbon atoms per part of cellulose, benzene, and sulfuric acid, then subjecting the cellulose ester formed while still in sheet form to a pullthrough of benzene to remove the anhydride therefrom, followed by a pullthrough of hot water so as to thoroughly wash the cellulose ester.

LLOYD E. HERDLE.
ERVIN L. PERKINS.

REFERENCES CITED

The following references are of record in the file of this patent:

UNITED STATES PATENTS

| Number | Name | Date |
|---|---|---|
| 1,858,993 | Heberlein, et al. | May 17, 1932 |
| 2,036,947 | McKee, et al. | Apr. 7, 1936 |
| 2,087,036 | Malm, et al. | July 13, 1937 |
| 2,112,115 | Richter | Mar. 22, 1938 |
| 2,159,014 | Dreyfus | May 23, 1939 |
| 2,176,850 | Goff | Oct. 17, 1939 |
| 2,253,724 | New, et al. | Aug. 26, 1941 |

FOREIGN PATENTS

| Number | Country | Date |
|---|---|---|
| 24,083 | Great Britain | 1904 |